US011120683B2

(12) United States Patent
Trupp

(10) Patent No.: US 11,120,683 B2
(45) Date of Patent: Sep. 14, 2021

(54) REMOTE CONTROL FOR INTERACTING WITH SMART HOME IOT DEVICES AND WEB SERVICES

(71) Applicant: Tony Trupp, Eugene, OR (US)

(72) Inventor: Tony Trupp, Eugene, OR (US)

( * ) Notice: Subject to any disclaimer, the term of this patent is extended or adjusted under 35 U.S.C. 154(b) by 79 days.

(21) Appl. No.: 16/808,294

(22) Filed: Mar. 3, 2020

(65) Prior Publication Data

US 2020/0286368 A1 Sep. 10, 2020

Related U.S. Application Data

(60) Provisional application No. 62/813,652, filed on Mar. 4, 2019.

(51) Int. Cl.

*G06F 15/173* (2006.01)
*G08C 17/02* (2006.01)
*G16Y 40/35* (2020.01)

(52) U.S. Cl.

CPC .............. *G08C 17/02* (2013.01); *G16Y 40/35* (2020.01)

(58) Field of Classification Search

CPC ........ G08C 17/02; G16Y 40/35; G16Y 40/30; G16Y 40/00
See application file for complete search history.

(56) References Cited

U.S. PATENT DOCUMENTS

2019/0373303 A1* 12/2019 Ashraf ............. H04N 21/42222
2020/0371755 A1* 11/2020 Patni ......................... G06F 8/41
2021/0118582 A1* 4/2021 Lee ......................... G10L 15/26

* cited by examiner

*Primary Examiner* — John B Walsh
(74) *Attorney, Agent, or Firm* — Klarquist Sparkman, LLP

(57) ABSTRACT

An apparatus, method, and system for triggering user configured Internet requests, with custom parameters, to 3rd party devices or APIs from a configurable hardware remote control device. The apparatus consists of a processor, radio wave communication system, graphical display, memory, a user interface and one or more batteries. In some embodiments, the interface may consist of a rotary knob and one or more buttons, or using directional arrows. This device allows browsing a list of configured routines, executing them, triggering network requests that perform 3rd party actions. In some embodiments, when configuring the Device via the External Configuration Application, parameters can be set for the routine, which will be entered or selected via the device prior to triggering the request. In some embodiments, the device can be set up to trigger http or https requests, where the querystring parameters, request method, and body content are configurable.

23 Claims, 8 Drawing Sheets

REMOTE CONTROL FOR INTERACTING WITH SMART HOME IOT DEVICES AND WEB SERVICES

CROSS REFERENCE TO RELATED APPLICATION

This application claims the benefit of U.S. Provisional Application No. 62/813,652, filed Mar. 4, 2019, which is incorporated herein by reference in its entirety.

FIELD

The present invention relates to a hardware Remote Control Device and related software system, which triggers actions via an Internet connection to 3rd party devices and web services. More specifically, it relates to how routines and parameters can be loaded onto the hardware remote control device, the user interface of the device and the method by which those routines & parameters are then executed to send requests to 3rd party device and web services, and how the Remote Control Device can be configured to make raw http/https requests to 3rd Party APIs.

BACKGROUND

With Wi-Fi becoming more ubiquitous, and micro-controllers becoming cheaper and more powerful, there has been an explosion of internet-connected appliances. This has become known as the Internet of Things (IoT for short). Many homes now have "smart" connected devices, such as light bulbs, thermostats, speakers, TVs, sprinklers, vacuums, etc. that leverage the connectivity of the Internet to perform their functions in new ways. But with most of these devices being manufactured by different companies, running on different platforms, configured and controlled with their own apps or switches, and using their own proprietary API integrations, trying to integrate them to be used in a consistent way can become complicated and confusing. There is increasingly a need to control these numerous devices in a simple, efficient and centralized manner.

A number of existing products have attempted to solve this problem in their own distinct ways. Some smart phone applications can control these Internet connected appliances. However, turning on the phone, navigating to the correct app, and executing a routine within that app is often slow and tedious. In addition, smart phones can become a distraction. They don't have great battery life, necessitating frequent recharging. Nor do they work well in a family or shared living environment, where everybody needs similar access to control the smart appliances.

There are voice activated smart home devices, but these have their own unique set of issues. They often misunderstand the spoken commands. They provide no interface to show what routines had been pre-programmed. They generally are not portable. And some people have privacy concerns about what is subsequently done with their collected voice data.

There are wall-mounted, touch screen devices. These typically have graphical user interfaces resembling smart phones and tablets, often running on heavier operating systems like Android, and, because of this, require more powerful processors, typically single board computers as opposed to low-power microcontrollers. These run on high-energy processors, and as larger touch-screen displays also consume more energy, they tend to require a constant power connection, therefore are not designed to be easily portable.

And since these devices are wall-mounted, they often require expensive professional installation to route the power wires to the unit.

There are simple on/off switches or Internet connected buttons, which trigger an action on one or just a few of these devices. But these simple switches and buttons are limited in the number of devices they can connect to (typically connecting to only 1-3 smart appliances), provide poor feedback to the user on the status of the network request, and provide no ability to send configurable parameters.

There are remote control devices that look roughly similar to conventional television or entertainment system remote controls, with numerous buttons including numeric keypads, whose primary function is to control televisions or entertainment systems (such as dvds, blueray, vhs, audio equipment, etc), but which also may be set up to trigger actions on other smart devices. However, these remote control devices are not optimized to work with these smart devices in a similar way as the invention described in this patent and are less configurable. For example, these do not allow for the open ended configuration of parameters on the external configuration application, where different parameter types can be freely created and customized, and in a way that allows those parameter values to be entered at execution time, which to be passed to other 3rd party devices or APIs when executed, as described in the figures and claims. And they do not provide a way to configure raw HTTP/HTTPS requests via an external configuration application. And the user interface of these more conventional looking remote control devices, since it's optimized more for TVs and entertainment systems, does not offer the simplicity and ease of use of the unique user interface described below.

The solution described in this disclosure solves these many issues in controlling IoT appliances within a smart home in a unique way.

In addition to IoT devices becoming more common within homes, businesses, and factories, there is also a proliferation of Internet connected computer systems with public facing web Application Program Interfaces (APIs). The breadth of functions that these web APIs provide is vast, including running tasks such as triggering posts on social media, sending email or chat application updates, and other notification services. Businesses have their own proprietary functions for these web APIs, performing custom tasks such as running batch jobs, performing backups, clearing caches, event tracking or logging, etc.

Currently, making calls to these APIs typically requires logging into a personal computer or laptop, which can be slow and cumbersome. If a business or factory were to create a custom hardware device to trigger their API endpoints, that effort could take several months or years to develop and would require a heavy investment. The embodiments herein described can be used to quickly make calls to these APIs from a simple, low cost, configurable hardware device, where businesses can customize the invention's remote control device to trigger their own APIs. If there were to be a portable hardware remote control device to accommodate for a vast number of possible use cases with minimum technical configuration, it would provide a novel solution that was currently not found in other products in the market. While Internet connected smart buttons might be able to trigger API calls, and thus might be useful for businesses to achieve very simple pre-configured network pings, the same problems with these devices mentioned above also apply here: limited number of actions, poor visual feedback on network request status, and importantly, no ability to change selected parameters at run time. And voice activated devices don't make much sense in a shared office or factory environment either since each employee might need to have their own unique routines configured on their own personal devices, running within earshot of each other. If they were to use voice-activated devices here, the wakeup command might trigger a neighboring device.

SUMMARY

In a first embodiment, an apparatus, method and system for triggering user configured Internet requests to 3rd party devices or web services with custom user defined parameters (such as numeric values, text strings or Boolean values) from a configurable hardware remote control device is disclosed. The remote control device apparatus comprises at least one processor, a radio wave communication system (e.g., including but not limited to Wi-Fi, LoRa, Z-Wave, Zigbee, or Bluetooth), a graphical display, memory, and a user interface. Additionally, the device can comprise at least one battery (either rechargeable or not rechargeable) to act as the primary source of power to the electronics, so as to be portable without wires (except, for example, while charging in embodiments with rechargeable batteries, or while updating software in some embodiments). The remote control device apparatus is setup using an External Configuration Application, where that device configuration data is stored on a Central API Server, and those configurations are loaded onto the device. The primary role of software running on the Remote Control Device is to allow the user to browse a list of routines, select a routine, enter values or select values from configured parameters for each routine, trigger that routine with selected parameters, and be notified of the network request status. After triggering the routine, the request may be routed through the Central API Server, which will notify available 3rd party devices or services of the action that took place, including any parameters associated with the routine as selected by the user.

In another embodiment, an apparatus, method and system for triggering user configured http/https network requests to 3rd party APIs from a configurable hardware remote control device is disclosed. In this embodiment, the remote control device apparatus comprises at least one processor, a radio wave communication system, a graphical display, memory, and a user interface. Additionally, the device can comprise at least one battery (either rechargeable or not rechargeable) to act as the primary source of power to the electronics, so as to be portable without wires (except, for example, while charging in embodiments with rechargeable batteries, or while updating software in some embodiments). The Remote Control Device apparatus is setup using an External Configuration Application, where the user can specify the request method (such as Get, Put, Post, Patch, Delete), the destination URL for the 3rd party API, and may optionally include one or more query string parameters, and may optionally include request body content. These user-configured routines are then loaded onto the device. The primary role of software running on the Remote Control Device is to allow the user to browse a list of routines, select a routine, enter values or select values from configured parameters for each routine, trigger that routine with selected parameters, and be notified of the network request status. Triggering the routine will make a network request to the routine's specified URL, with any optional user provided query string parameters, and/or body content, where a user configured 3rd party API will perform an action based on the API endpoint requests, and the query string and/or body content data will be provided with that network request.

In another embodiment, a Remote Control Device apparatus and software running on the apparatus for triggering user configured Internet requests to 3rd party devices or services or APIs from a configurable hardware remote control device is disclosed. This embodiment comprises a hardware user interface that has a rotary knob or wheel, and one or more buttons. This knob or wheel might physically rotate, or it might be a capacitive touch wheel, where it detects the position on the wheel that is being touched. The remote control device apparatus also comprises at least one processor, a radio wave communication system, a graphical display, and a memory. Additionally, the device can comprise at least one battery (either rechargeable or not rechargeable) to act as the primary source of power to the electronics, so as to be portable without wires (except for example while charging in embodiments with rechargeable batteries, or while updating software in some embodiments).

With software running on the Remote Control Device, users can browse through a list of their configured routines with the rotary knob or wheel, select a routine, and enter or select values for the routine's user configured parameters with the rotary knob or wheel. When a routine is triggered it will make a network request with the selected routine data and any provided parameters. The device will provide feedback to the user with the network request status, where a 3rd party device or web service associated with that routine during the user configuration will perform an action with the supplied parameters. Software running on the Remote Control Device has the primary function of allowing the user to browse and trigger their custom routines, with their custom configured parameters. By rotating the knob or wheel, they can browse through the list of routines. They can then select a routine, and use the knob or wheel to enter or select values for that routine's user configured parameters, before then triggering the routine. When a routine is triggered it will make a network request with the selected routine data and any selected or entered parameters to the 3$^{rd}$ party device or service specified by the user.

In another embodiment, a Remote Control Device apparatus and software running on the apparatus for triggering user configured Internet requests to 3rd party device or services or APIs from a configurable hardware remote control device is disclosed. This embodiment has a hardware user interface that comprises at least four directional arrow buttons. The remote control device apparatus also comprises at least one processor, a radio wave communication system, a graphical display, and a memory. Additionally, the device can comprise at least one battery (either rechargeable or not rechargeable) to act as the primary source of power to the electronics, so as to be portable without wires (except for example while charging in embodiments with rechargeable batteries, or while updating software in some embodiments). Software running on the Remote Control Device has the primary function of allowing the user to browse and trigger their custom routines, with their custom configured parameters. Using the opposing directional arrows they can select a routine, enter or select values for the routine's user configured parameters with the directional arrows, then trigger the routine. When a routine is triggered it will make a network request with the selected routine data and any selected or entered parameters to the 3$^{rd}$ party device or service specified by the user.

In another embodiment, the routines may be grouped into directories and subdirectories. In another embodiment, the device can require a pin or password after power-on or wakeup, or before triggering a routine. In another embodiment, the device provides logging of triggered routines and parameter data, for later analysis and auditing by users.

DETAILED DESCRIPTION

Figure 1:
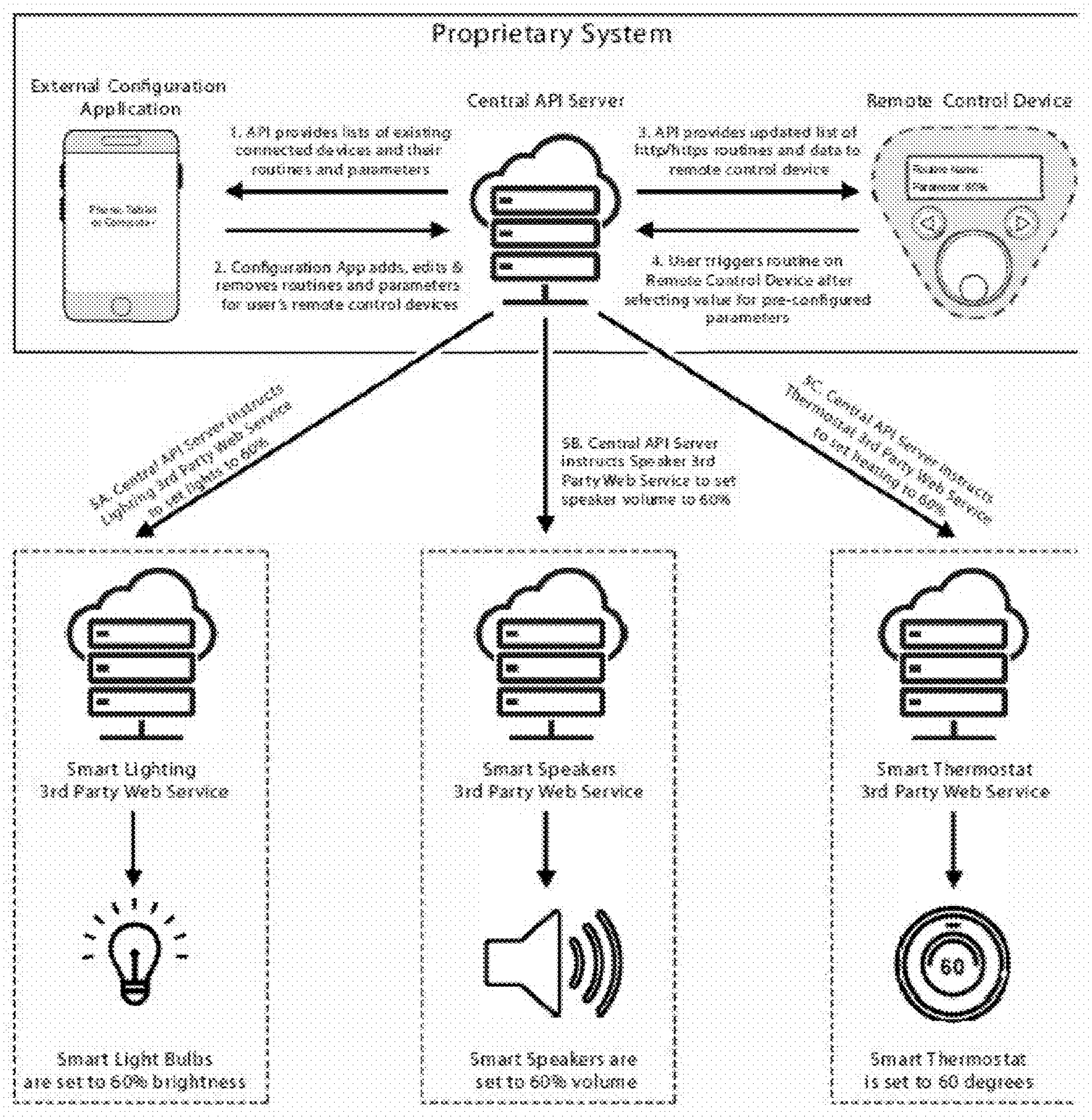
FIG. 1 illustrates a high-level overview of the communication between the External Configuration Application, the Central API Server, and the Remote Control Device, when triggering routines that pass parameters to available third party services. It shows how $3^{rd}$ party devices or web services may be configured to then trigger further actions, and how the $3^{rd}$ party device or service might use parameters provided by the user via the Remote Control Device. It demonstrates how calls may be made from the Remote Control Device to the $3^{rd}$ party device or service through the Central API Server, where the user does not manually need to enter any URL or request method or query string parameters for the $3^{rd}$ party device or service to be called, but rather to specify which $3^{rd}$ party device or service is to be called, and the Central API Server handles the communication with those $3^{rd}$ party devices or services. Note that this figure demonstrates only how the different parts of the system relate to each other, and that the display and interface of the Remote Control Device shown here is only one possible embodiment of the apparatus itself.
Figure 2:
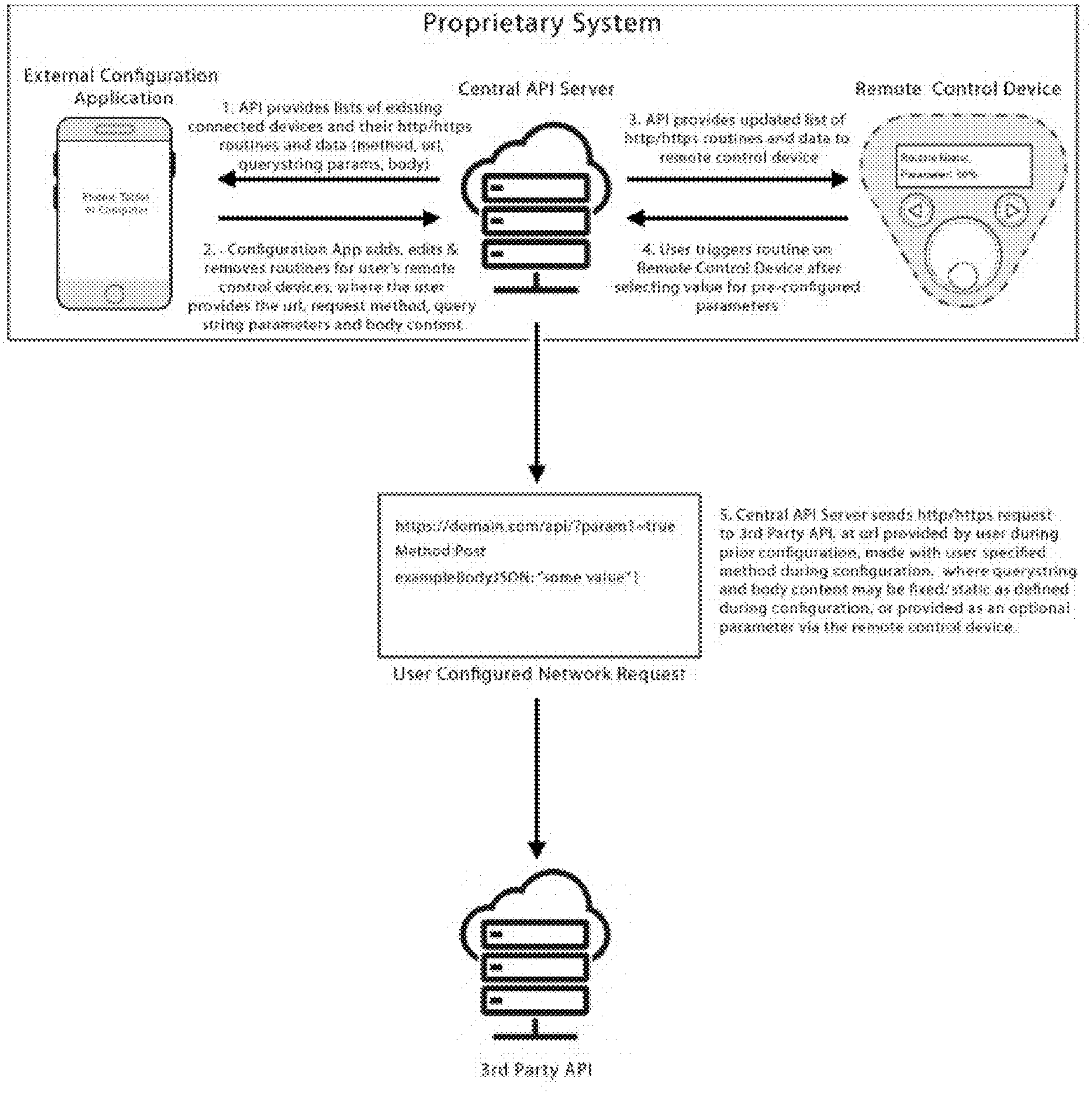
FIG. 2 demonstrates a high-level overview of the communication between the External Configuration Application, the Central API Server, and the Remote Control Device when triggering raw http/https from the Remote Control Device. It shows how $3^{rd}$ party devices or services may be configured to then trigger further actions, and how the $3^{rd}$ party device or service might use parameters provided by the user. It demonstrates how calls may be made from the Remote Control Device to the $3^{rd}$ party device or service through the Central API Server (in one possible embodiment, as requests may also be triggered directly from the Remote Control Device to the $3^{rd}$ Party Service in another embodiment).

Disclosed herein is a hardware Remote Control Device and associated system, including in some embodiments an External Configuration Application and Central API Server(s), that can be configured to provide a simple way to trigger routines with parameters, in the form for internet requests, such as firing off HTTP/HTTPS network requests to 3rd party APIs, calls to web services, or controlling IoT smart home appliances. A routine as used herein is defined as a user-configured task, that when triggered on the Remote Control Device, will make a network request, performing some $3^{rd}$ party action which is configured by the user. The Central API Server(s) as used herein is a web service, which manages data and configuration settings on both the External Configuration Application and the Remote Control Device. Some of the embodiments disclosed herein relate to how this routine data is configured by the external configuration application and loaded onto the remote control device, how parameters can be sent along with the routine, how the system can be configured to make raw HTTP/HTTPS requests, and different dependent variations related to how network calls are made and variations of the Remote Control Device's user interfaces.

As described herein, the hardware Remote Control Device is a physical electrical apparatus dedicated primarily to triggering configured routines, which will make Internet network calls, triggering actions on 3rd party systems. The device itself comprises at least one processor. The device also comprises a GUI display screen, a radio-based communication system (using, for example, Wi-Fi, Lora, Z-Wave, Zigbee, Bluetooth, or any other suitable communications protocol), memory for storing routines and parameters, a printed circuit board to hold the components, user input controls, and an enclosure shell.

The GUI display screen is connected to the processor and to a power supply, where the processor controls what is displayed, and whether the display is powered on or off. The radio-based communication system is also connected to the processor, where the processor triggers network requests made by the communication system. The radio-based communication system may be bundled with the processor, as is the case with some microcontrollers, or it may be a separate component. The processor is also connected to memory so that data about routines and their parameters can be retained, both while the device is running and between power cycles. Most of the electronics can be held upon a printed circuit board, including the processor, power regulation, and memory. The Remote Control Device will be powered primarily from at least one battery, so as to be wireless and portable, thus eliminating the need to be connected to a power outlet for normal operation, and without needing the expensive professional installation of wall-mounted devices. The Remote Control Device's battery or batteries may be either rechargeable or not rechargeable, where if the battery or batteries are rechargeable, it may have a wire connected to it during charging (unless wirelessly charging).

Figure 5:
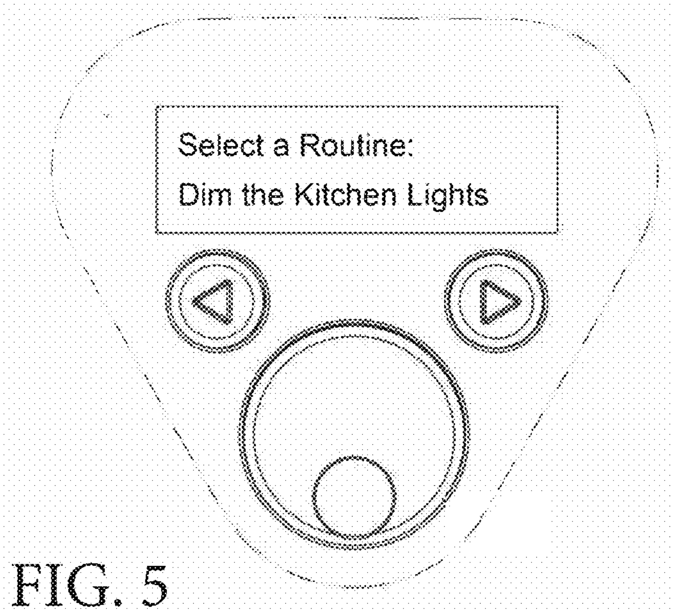
FIG. 5 demonstrates one embodiment of the Remote Control Device apparatus where the Remote Control Device comprises a rotary knob or wheel, which allows the user to scroll through the list of routines, which can also be used to increment/decrement parameter values, or switch between true and false for Boolean parameters, or to select from characters to enter text with a string parameter data type, before triggering the routine. In one embodiment, the small button to the left of the other small button can be used to navigate backwards to the previous step. This embodiment also shows a smaller right button, which isn't required for this claim, but could provide another way to select the routine or the parameter, allowing the user to proceed to the next step. Alternatively, in another embodiment, the rotary knob or wheel could be pressed down or tapped in the center to select the routine or parameter, and the small right button wouldn't be required, but one or more additional buttons could be used for other tasks.
Figure 6:
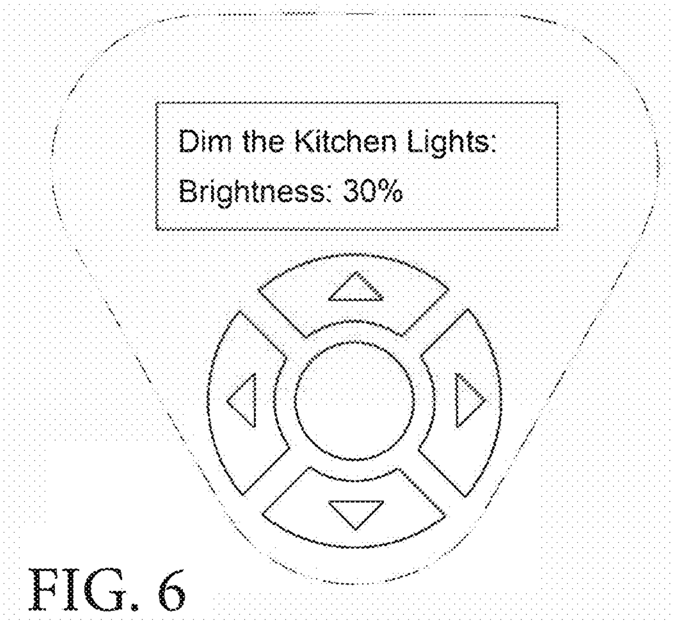
FIG. 6 demonstrates another embodiment of the Remote Control Device apparatus where the Remote Control Device comprises navigation arrows, which allows the user to scroll through the list of routines with opposing arrows (left & right or up & down), or the arrows can be used to increment/decrement parameter values using opposing arrows, or switch between true and false for Boolean parameters, or to select from characters to enter text with a string parameter data type before triggering the routine. In one embodiment, the left or up arrow (whichever isn't used for scrolling through options) can be used to navigate backwards to the previous step. In one embodiment there could be a center button to select the routine or the parameter, to navigate to the next step. In another embodiment the user could simple use the right or down arrow (whichever isn't used for scrolling through options) to proceed to the next step. Additional buttons may or may not be present on the device for performing other tasks.
Figure 7:
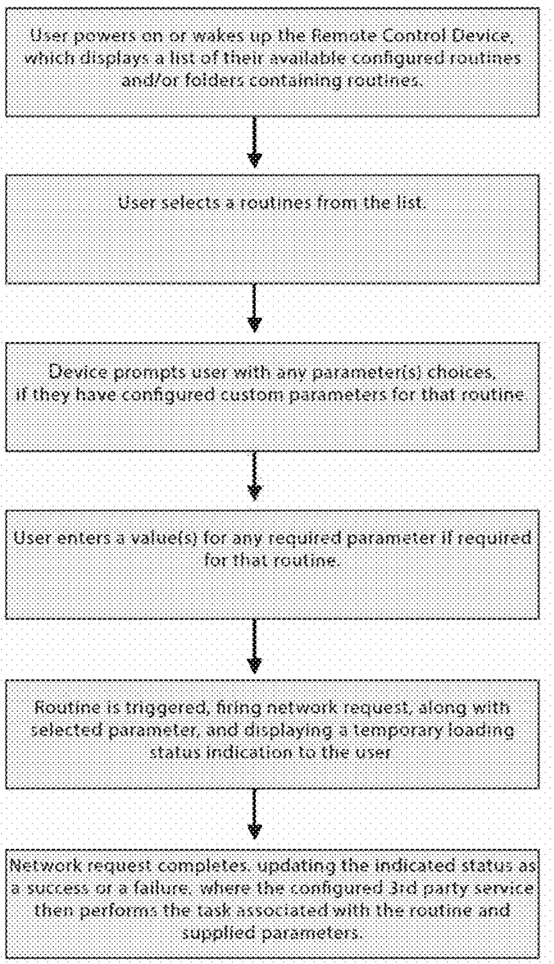
FIG. 7 shows one possible embodiment of the sequence of steps that would occur on the Remote Control Device, to allow a user to select a routine, then select a parameter (if required for that routine), before triggering the routine, seeing the loading status, and the success/fail message, at which time the action is triggered.

Also described herein are different embodiments of the User Interface of the Remote Control Device (as shown in FIG. 5 & FIG. 6). These user interface controls may include but are not limited to hardware buttons, rotary encoders and touch screen displays, where these are connected to the processor, generally through the use of GPIO pins. In one embodiment, the device can be encased in an enclosure shell to protect the electronic components. In one embodiment, plastic can be used for these enclosure shells. In other embodiments, there could also be other materials used here (e.g., metal, wood, carbon fiber, acrylic, glass, etc). In other embodiments, a capacitive touch printed circuit board can be used and exposed to the outside of the device, limiting the need to completely wrap all sides of the Remote Control Device's electronics.

In terms of software running on the Remote Control Device, the user interface allows the user to quickly scroll through a list of configured routines shown on the graphical display, select a routine that they would like to execute, optionally provide a value for any parameters necessary for that specific routine (as configured by the external configuration application), and then trigger the routine, firing off a call through the radio-based communication system, all with just a few clicks. After executing the routine, an action will be performed based on the prior configuration selected by the user. Triggering the routine will cause a TCP/IP network request to be sent from the communication system, ultimately instructing a 3rd party device or service to perform some action. Further details on how that is triggered, with and without a Central API Server acting as a proxy, are provided below.

To use the Remote Control Device it must be configured with routines. This is done via an External Configuration Application. This configuration application may be run from a mobile or tablet device, or from a personal computer or laptop. A user will be able to browse through a list of devices associated with their account, add/edit/remove routines for each device, and provide additional configuration information for each routine, such as whether the remote control device should require any additional parameters to trigger a routine. These parameters are optional, and may be of various data types, such as numeric values, text strings or Boolean values. Other routines may require no additional parameters to execute. The user would be able to specify an action to be performed or an API endpoint to be triggered when the Remote Control Device executes the routine. In some embodiments, those routines can additionally be executed directly from the External Configuration Application, without requiring the Remote Control Device to trigger that routine.

Typically, software applications that work with another smart appliance are built primarily as thin-client user interfaces, where the data that is displayed is then read, written or deleted from another Central API Server. The user interface of the External Configuration Application disclosed herein may be html or markup language based, loaded as a webpage, or it may be generated from compiled code (such as swift, java, objective-c, C#, etc.). When loading the External Configuration Application, after authenticating the user, the External Configuration Application can make subsequent calls to the Central API Server to retrieve the list of devices for the user, the devices' routines, and the routine's parameters, which can then be navigated and altered by the user within the External Configuration Application. When making changes to devices, routines and parameters, that data would then be updated within some kind of data store within the Central API Server, such as a database or some other file format. There are other less common ways of implementing the saving of this configuration data from an application, as discussed further below.

One primary reason for configuring the routines on this External Configuration Application is to simplify the interface and processing requirements of the hardware Remote Control Device. By offloading this configuration function, the interface on the remote control device can be much simpler and less confusing, making the Remote Control Device dedicated primarily to the specific task of triggering routines. The remote control device could also then run off of a less powerful processor, such as a micro-controller, which will have lower power consumption, longer battery life, and will likely cost less to produce and have a lower price to the consumer. And after configuring the routines on a more powerful computer or phone, they are less likely to get broken or misconfigured by someone using the Remote Control Device who is less technically inclined. Since users who may not have initially configured the device can scroll through and see which routines have been loaded, it is much more family friendly than voice activated smart devices that lack a GUI, which lack the ability to see available routines and thus require remembering what custom routines have been configured.

In one embodiment, when using the External Configuration Application to configure the device, the configuration data would also flow through the Central API Server(s), so that the Central API Server(s) can act as the master record of this configuration, and so that routines can be setup from anywhere, even if the remote control device isn't nearby. However, in other embodiments, the Central API Server(s) can be initially bypassed during configuration and program the device directly from the External Configuration Application. This approach has its own shortcomings, such as having a larger potential for configuration data loss due to the data not being stored as securely in the cloud, where it could otherwise be backed up regularly. The method used here in passing the configuration information to the remote control device is less important than the broader system.

An example of a configurable routine with parameters may be to dim the living room lights to 60%, when after selecting the "dim the living room lights" routine, the user is prompted with a brightness value, where they can increase/decrease that parameter, before triggering the routine, setting the living room lights' brightness to 50%. Another routine running on the same device might be "run sprinklers for number of minutes", where after selecting the routine, the user can increase/decrease the minutes parameter to 15, and after triggering the event the sprinklers will run for 15 minutes. One novel aspect of this disclosure is how these user configured parameters can be made available for each routine, where the number and type and possible values of these parameters are customizable to the user via the external configuration application, to keep the remote control device's interface simpler to use. This invention provides a unique way for users to pre-configure those parameters via the secondary external configuration application so that on the remote control device the options are stripped down to a minimum number of clicks, while also allowing numerous routines to be configured on a single device, achieving a level of flexibility, speed and simplicity in solving this smart home complexity problem that is unprecedented in other inventions.

The figures and claims herein also provide a few different embodiments of how the Central API Server might interact within this system. Some of the primary functions that this server provides are to track which remote control devices belong to which users, to store the routine configuration settings for each remote control device, and, in some embodiments, to act as a proxy that requests from the device flow through before reaching a 3rd party device or service. There are numerous programming frameworks and technologies for coding server APIs, and the embodiments disclosed herein should not be limited to just one of those. Most commonly however, these APIs work with TCP/IP based requests, over the HTTP or HTTPS protocol, using a REST, SOAP or GRPC based protocol for requesting the data. Requests to the API can require authentication, so that registered users can access those endpoints securely, and users can only trigger routines belonging to devices associated with their accounts.

In one embodiment, after the External Configuration Application makes updates to routines and parameters, that data can then be saved to the Central API Server, which in turn would allow that routine data to be loaded onto the device. Transferring this routine data to the Remote Control Device could be pushed as it is updated through a socket connection, or it could be requested by the Remote Control Device to the Central API Server, after the device wakeup or some other triggering event like selecting an update command on the device, where the configuration data would then be returned from the Central API Server in the response.

Figure 3:
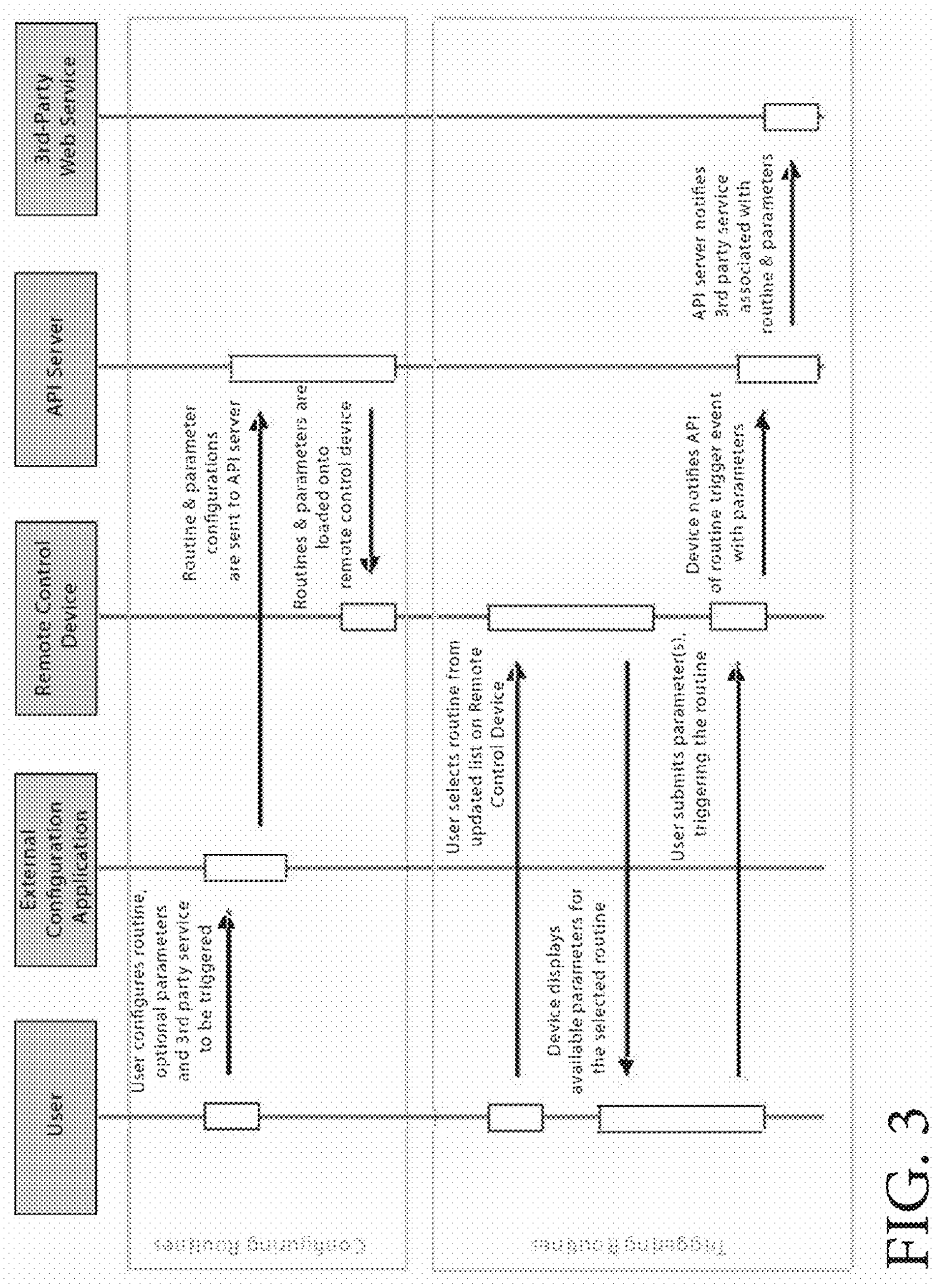
FIG. 3 first demonstrates the process by which routines are setup on the External Configuration Application, then passed to the Central API Server, and loaded onto the Remote Control Device. And it demonstrates how users can then select a routine from the Remote Control Device, provide any additional parameters if required, and how the Remote Control Device then makes a request to the Central API Server, which in turn notifies the $3^{rd}$ Party Web Service or API that the routine has been triggered.
Figure 4:
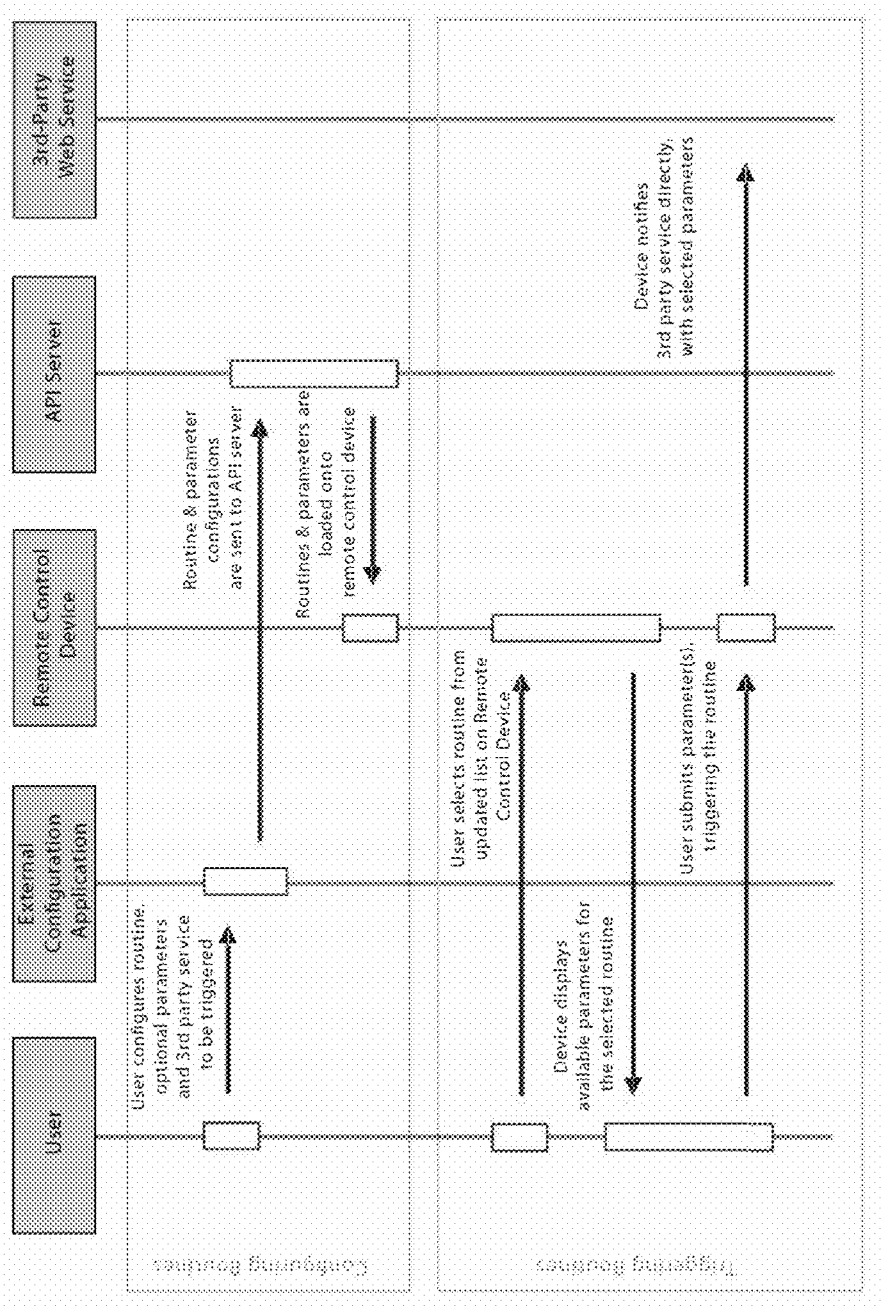
FIG. 4 first demonstrates the process by which routines are setup on the External Configuration Application, then passed to the Central API Server, and loaded onto the Remote Control Device. And it also demonstrates how users can then select a routine from the Remote Control Device, providing any additional parameters if required. But differing from FIG. 3, FIG. 4 demonstrates a different embodiment, where the Remote Control Device may then make the call directly to the $3^{rd}$ party device or service or API, bypassing the Central API Server.

There are pros and cons of sending the routine trigger requests through this Central API Server (as shown in FIGS. 3 & 4), and the embodiments disclosed herein do not require that those requests coming from the Remote Control Device only be made through the Central API Server. Since from an end user's point of view it makes little difference, the embodiments disclosed herein cover both approaches. If the Remote Control Device were to run from a low power microcontroller, which tends to have less resources like memory and speed, but which allow for lower cost and longer battery life, then it would be simpler to integrate to the $3^{rd}$ party device or services from the Central API Server, and use the Remote Control Device only to trigger the routine, telling the Central API Server that the $3^{rd}$ party device(s) or service(s) associated with a routine should be triggered (as shown in FIG. 3). This approach would also allow any code updates or bug fixes with the $3^{rd}$ party devices or services to be instantly available, rather than forcing the device to update its firmware first. The Central API Server would have programmed integrations with a number of $3^{rd}$ party web services, which the user could select from on the External Configuration Application when setting up routines. Some of these $3^{rd}$ party web services might also be aggregators of other $3^{rd}$ party services, providing further integrations, where a further configuration is required on that first $3^{rd}$ party service to specify another action with a different $3^{rd}$ party service that is performed after receiving the routine trigger event notification.

In an alternate implementation, where the call to the $3^{rd}$ party device or service occurs directly from the Remote Control Device itself, bypassing the Central API Server (as shown in FIG. 4), those integrations with the $3^{rd}$ party device or service would instead be loaded onto the device, or a LAN hub to which the device connects. One benefit of this approach would be that the network request to the $3^{rd}$ party device or service would be a bit faster, as it wouldn't have to make the additional hop to the Central API Server. However some of these $3^{rd}$ party devices or services require a public facing API, where those integrations wouldn't be compatible with this approach if the Remote Control Device was on a local area network, without any static domain or IP, and difficult to reach from behind firewalls.

In addition to working with these IoT devices, the embodiments disclosed herein also work well with making raw HTTP/HTTPS network requests to web application program interfaces (APIs). More businesses are making their computer processing functionality accessible via web services, often providing REST based interfaces for exposing their systems to other nodes on the Internet. Similar to how there is an opportunity to simplify routines which execute actions on IoT appliances, the embodiments disclosed herein can also simplify calls to these 3rd party web service APIs, which tend to be done via REST requests using the HTTP/HTTPS network protocol. This makes more sense for the remote control device described herein when the API endpoint will trigger some task, rather than a request that simply returns data to the device (such as with a web browser returning HTML based websites over HTTP/HTTPS). The possible use-cases here are numerous. Businesses and factories might be looking for simple ways to make calls to those endpoints quickly, without having to log in to a computer. These endpoints might be used to turn on or off equipment, to track events, to trigger batch processing, to provide data logging, etc. The remote control device itself is largely not tied with the action that occurs after the routine is triggered (except for perhaps the status of the network response). The action is dependent upon how the user configures each routine, and the setup of the $3^{rd}$ party system that is being called.

When configuring routines, there is an option to create a HTTP or HTTPS network request. After choosing this option, the user can then specify the endpoint URL, the request method (such as Get, Post, Put, Patch or Delete), any additional query string parameters to optionally be appended to the URL, and an optional request body content payload. How this data is configured for each routine will depend upon the unique requirements of each 3rd party API. After the HTTP/HTTPS request is configured it can be easily triggered at any point from the remote control device, by following the same sequence of steps as the non-http/https method: The user selects the routine, provides values for any associated parameters for that routine, and then triggers the routine, which will then make the TCP/IP network call to the $3^{rd}$ party device or service (either through the Central API Server or directly, bypassing the Central API Server). So with this device, a programmer or technician could quickly fire off calls to their server, performing important business functions. There are also smart home hubs that have APIs that could be interacted with in a similar way. Technically allowing for these open ended HTTP/HTTPS calls from the device to the Central API Server, and having this Central API Server integrated with the $3^{rd}$ party APIs, is simpler than programming a bunch of unique $3^{rd}$ party API integrations on the device itself, especially if using a microcontroller with more limited processing power and memory.

For an additional layer of security, the user may configure the device using the external configuration application so that upon startup/wakeup, or upon triggering a routine, for a security pin or password to be entered before the request can be made. After entering the password or pin, the routine can be triggered as normal.

To help organize a large number of routines, one embodiment of this system would be to allow for the routines to be grouped into folders or directories. These may in turn have other subfolders and subdirectories. The directories would be configured on the External Configuration Application, each given a name by the user, whereupon loading the configuration data onto the Remote Control Device, when browsing through the root level list, the user could see either routines or folders containing routines.

To aid users in the quick selection of routines, one embodiment of this system would be to use frequency and/or time of prior routine triggers to automatically select a routine, or to automatically order the list of folders or routines. For example, if a user selected the routine to turn on the kettle every day at 8 AM, then the software could store that usage data, and automatically select that routine if the remote control device was activated near this time. In some embodiments, this could be done using artificial intelligence techniques such as machine learning. In other embodiments, a standard programming algorithm can be used, where the times and frequencies are stored in memory for reference and those routines that have been executed most often or closest to the current time are weighted most heavily, and will therefore be suggested first.

Computing Systems

Figure 8:
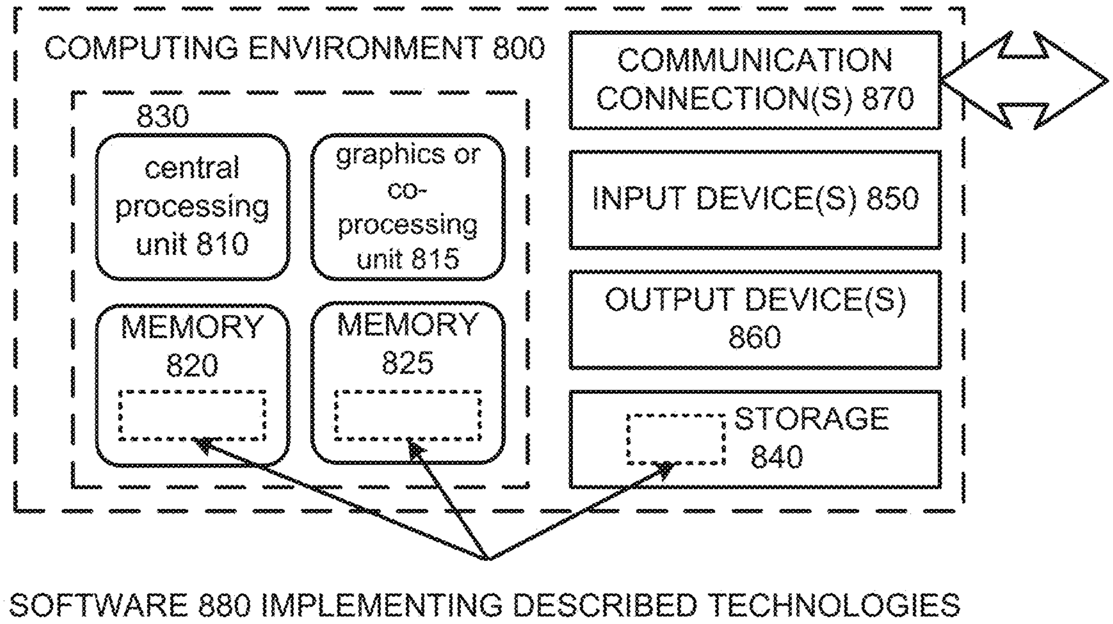
FIG. 8 is a diagram of an example computing system in which some described embodiments can be implemented.
Figure 9:
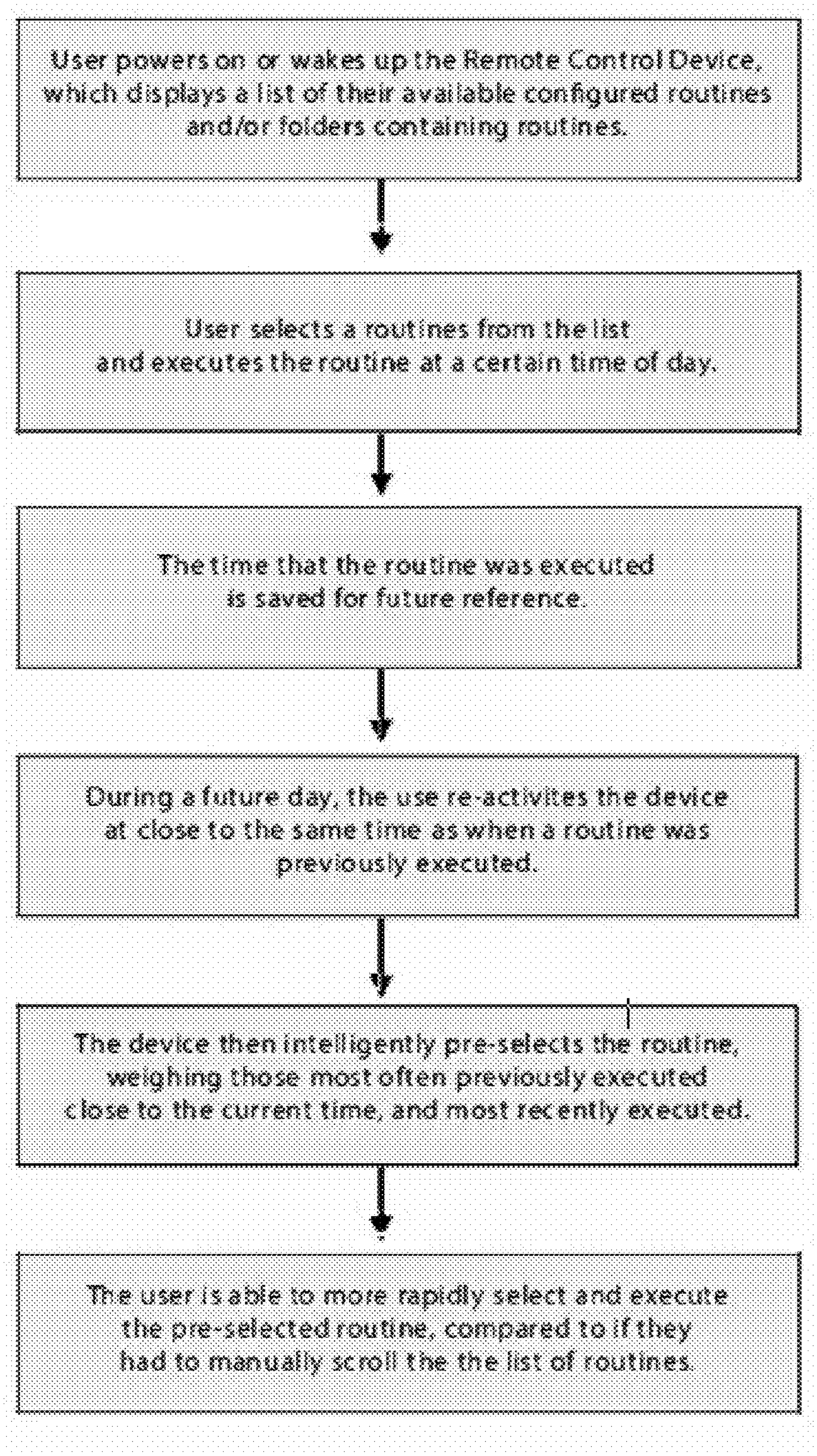
FIG. 9 shows one possible embodiment of the sequence of steps that would occur on the Remote Control Device when the software uses historical usage data to predict which routine the user is likely to select next, to pre-select or pre-sort routines, so as to allow for quicker execution.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, solid state storage, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, radio wave based communication signals, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections, such as 870.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C#, Java, Perl, Python or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope of the following claims.

I claim:

1. A method comprising:

receiving routine configuration data from an external configuration application comprising data for making a call to a web API including a network URL for at least one routine, the routine configuration data being selected to create one or more custom parameters, wherein the routine configuration data comprises a name for each parameter, a data type for each parameter, the allowed values for each parameter; and/or querystring parameters and/or request body content that can include placeholder variables to indicate where the values from the custom parameters will later be included;

transmitting to a remote control device the at least one routine and the custom parameters associated with each routine;

receiving a selection of the at least one routine from the remote control device and prompting for values to be entered for the parameters associated with the selected routine; and after receiving the entered values, triggering an HTTP or HTTPS network request to the network URL with the values of the provided parameters inserted where the placeholder variables previously were within the querystring parameters and/or the request body content during the configuration step.

2. The method of claim 1, further comprising:

when the one or more request is executed, sending the one or more request to a 3rd party device or service or the API of a local area network hub, and bypassing a central API server, in order to allow the endpoint to not need to be accessible from outside of the local area network.

3. A method comprising:

receiving routine configuration data of a routine from an external configuration application comprising data required for triggering an action on a 3$^{rd}$ party device or service, the routine configuration data including information about one or more custom parameters comprising a name, a data type, and allowed values;

associating the one or more custom parameters with one or more available options for the 3$^{rd}$ party device or service;

transmitting to a remote control device routine data comprising data of the routine and the one or more custom parameters associated with the routine;

receiving a selection of the routine on the remote control device; and prompting for values to be entered for the parameters associated with the selected routine, which after being provided by the user, will execute the routine to trigger a network request for the routine, including the provided parameter values, which will then be used to execute the associated action on the 3$^{rd}$ party device or service using the values of these custom parameters to specify the behavior of the 3$^{rd}$ party device or service.

4. The method of claim 3, further comprising:

when the selected routine is executed, sending a web request first to a central API server, which will then notify other 3rd party services of the event.

5. The method of claim 3, further comprising:

when the selected routine is executed, sending the request to a 3rd party device or service or API of local area network hub, bypassing a central API server.

6. The method of claim 3, further comprising:

tracking a time, frequency, and associated data of the execution of the selected routine to obtain historical usage data; and based on the tracked information, predicting a routine that is likely to be selected based on the historical usage data and auto-selecting and/or auto-sorting routines.

7. An apparatus for triggering user configured Internet requests to 3$^{rd}$ party devices or services from a configurable hardware remote control device, with custom user defined parameters, where the entire system comprises of:

a hardware remote control device, with at least one processor, at least one radio wave based communication system, a graphical display, user interface for navigating routines and their parameters, memory to store routine data, and at least one battery as a primary source of power to the electronics, so as to be typically portable without wires;

software running on the remote control device, where the primary function is to select and trigger the user's preconfigured routines with their custom parameters, where this functionality is available by default without the user having to install 3$^{rd}$ apps, and which allows a user to select a routine, and then to enter values for the routine's user configured parameters, as defined by the user for each routine, which when triggered will make a network request with the selected routine data and parameters, where a 3rd party device or web service associated with that routine will perform an action with the supplied parameters;

an external configuration application, to be run from an external computer or mobile or tablet device, which will allow the each user to configure the routines, including creating a name for each routine, and each routines' optional parameters as defined by the user, with user entered parameter name and user selected data types and allowed values, and where the user can connect the routine to an available 3rd party device or web service to be triggered when the routine executes; and at least one central API server, which will store data on which devices belonging to each user, and allow users via the external configuration application to add/edit/remove routines and parameters for each device, and which will then load those routines and parameters onto the remote control device, which can then be executed by the remote control device to trigger the 3rd party device or web service.

8. The apparatus of claim 7, wherein, when a routine is executed, the remote control device is configured to send a web request first to the Central API Server, which will then notify other 3rd party device or services of the event, so that the 3rd party device or service can perform actions following the trigger event, including but not limited to calling 3rd party web services, controlling Internet-of-things smart home devices or making requests to web APIs.

9. The apparatus of claim 7, wherein, when a routine is executed, the remote control device is configured to send to the 3rd party device or services or the API of a local area network hub, whether that be directly from the device or via a separate local hub device, bypassing the Central API Server.

10. The apparatus of claim 7, wherein the remote control device further comprises a user interface configured to allow users to scroll through loaded routines and routine parameters displayed on the graphical display via a rotatable knob or wheel, wherein the knob or wheel may physically rotate or comprise a capacitive touch sensor to sense a position of the users touch.

11. The apparatus of claim 7, wherein the remote control device further comprises a user interface that is configured to allow users to scroll through loaded programs and routine parameters displayed on the graphical display via directional arrows.

12. The apparatus of claim 7, wherein the remote control device further comprises a user interface that is configured to allow users to scroll through loaded programs and routine parameters displayed on the graphical display via a touch screen display, wherein the buttons or controls are represented on the display screen itself.

13. The apparatus of claim 7, wherein the remote control device is configured to track a time and a frequency and associated with routine execution to obtain historical usage data, and the remote control device is configured to, when the device is activated, predict a routine that the user is most likely to want to trigger based on the historical usage data, and auto-select and/or auto-sort routines based on the same.

14. An apparatus for triggering user configured http/https requests to 3rd party API from a configurable hardware remote control device, where the request data provided by the user while configuring a routine includes the request method, a user provided destination url for the 3rd party API, optional query string parameters, and an optional content body payload, where the parameters can be entered or selected on the device before triggering on the routine, where the entire system comprises:

a hardware remote control device, with at least one processor, at least one radio wave based communication system, a graphical display, user interface for navigating routines and their parameters, memory to store routine data, and at least one battery to power to the electronics, so as to be typically portable without wires;

software running on the apparatus, where the primary function is to select and trigger the user's preconfigured routines with their custom parameters, where this functionality is available by default without the user having to install 3$^{rd}$ apps, to optionally enter values for to be included in each routine's user configured query string or body content values, which when triggered will make a network request to the routine's specified URL, with any optional user provided query string parameters and/or body content, where a 3rd party API can then perform some action based on that triggering event and the query string and/or body content data;

an external configuration application configured to be run from an external computer or mobile or tablet device, which will allow a user to configure the routines, including creating a name for each routine, specifying their destination URLs, and each routines' optional query string parameters and/or body content, to be loaded onto the user's remote control devices.

15. The apparatus of claim 14, wherein the remote control device is configured to, when a routine is executed, send a request to the 3rd party services or to the API of a local area network hub, bypassing the central API server, in order to allow the endpoint to not need to be accessible from outside of the local area network.

16. The apparatus of claim 14, wherein the remote control device comprises a user interface that allows users to scroll through loaded routines and routine parameters displayed on the graphical display via a rotatable knob or wheel, where the knob or wheel may physically rotate or have a capacitive touch sensor in order to sense a position of the user's touch.

17. The apparatus of claim 14, wherein the remote control device comprises a user interface that allows users to scroll through loaded programs and routine parameters displayed on the graphical display via directional arrows.

18. The apparatus of claim 14, wherein the remote control device comprises a user interface that allows users to scroll through loaded programs and routine parameters displayed on the graphical display via a touch screen display, wherein the buttons or controls are represented on the display screen itself.

19. The apparatus claim 14, wherein the remote control device is configured to track a time and, a frequency, and associated data of routine execution to obtain historical usage data, and upon activation, the remote control device is configured to predict a desired routine based on the historical usage data, and auto-select and/or auto-sort routines based on the same.

20. An apparatus for triggering user configured Internet requests to 3rd party web services or APIs with parameters, acting as a remote control device, the apparatus comprising:

a hardware remote control device, with at least one processor, at least one radio wave based communication system, a graphical display, memory to store routine data, and at least one as a primary source of power to the electronics, so as to be typically portable without;

a hardware user interface, consisting of at least one rotary knob or wheel, and one or more buttons, where the knob or wheel may physically rotate or including a capacitive touch sensor, sensing the position of the users touch, which is used for navigating routines and their parameters;

software running on the apparatus, where the primary function is to select and trigger the user's preconfigured routines with their custom parameters, where this functionality comes available to be configured without requiring the installation of additional 3$^{rd}$ party applications, where those routines are first browsed with the rotary knob or wheel, allowing the user to select from one of their saved routines, and to enter values for the routine's user configured parameters with the rotary knob or wheel, which when triggered will make a network request with the selected routine data and any parameters for that routine, where a 3rd party web service associated with that routine during the user's configuration will perform an action with the supplied parameters.

21. The apparatus of claim 20, wherein the remote control device is configured to track a time, frequency, and associated data of routine execution to obtain historical usage data, and upon activation, predict a desired routine based on the historical usage data, and auto-select and/or auto-sort routines.

22. An apparatus for triggering user configured Internet requests to 3rd party web services or APIs with parameters, acting as a remote control device, which comprises of:

a hardware remote control device, with at least one processor, at least one radio wave based communication system, a graphical display, memory to store routine data, and at least one battery as a primary source of power to the electronics, so as to be typically portable without wires;

a hardware user interface, comprising at least four directional arrow buttons, for navigating routines and their parameters;

software running on the apparatus, where the primary function is to select and trigger the user's preconfigured routines with their custom parameters, where this functionality comes available to be configured without requiring the installation of additional 3$^{rd}$ party applications, where those routines are first browsed with opposing arrows, allowing the user to select from one of their saved routines, and to enter values for the routine's user configured parameters with the arrows, which when triggered will make a network request with the selected routine data and any parameters for that routine, where a 3rd party web service associated with that routine during the user's configuration will perform an action with the supplied parameters.

23. The apparatus of claim 22, wherein the remote control device is configured to track a time, frequency, and associated data of routine execution to obtain historical usage data, and predict a desired routine based on the historical usage data, and auto-select and/or auto-sort routines based on the same.

* * * * *